Patented Mar. 14, 1950

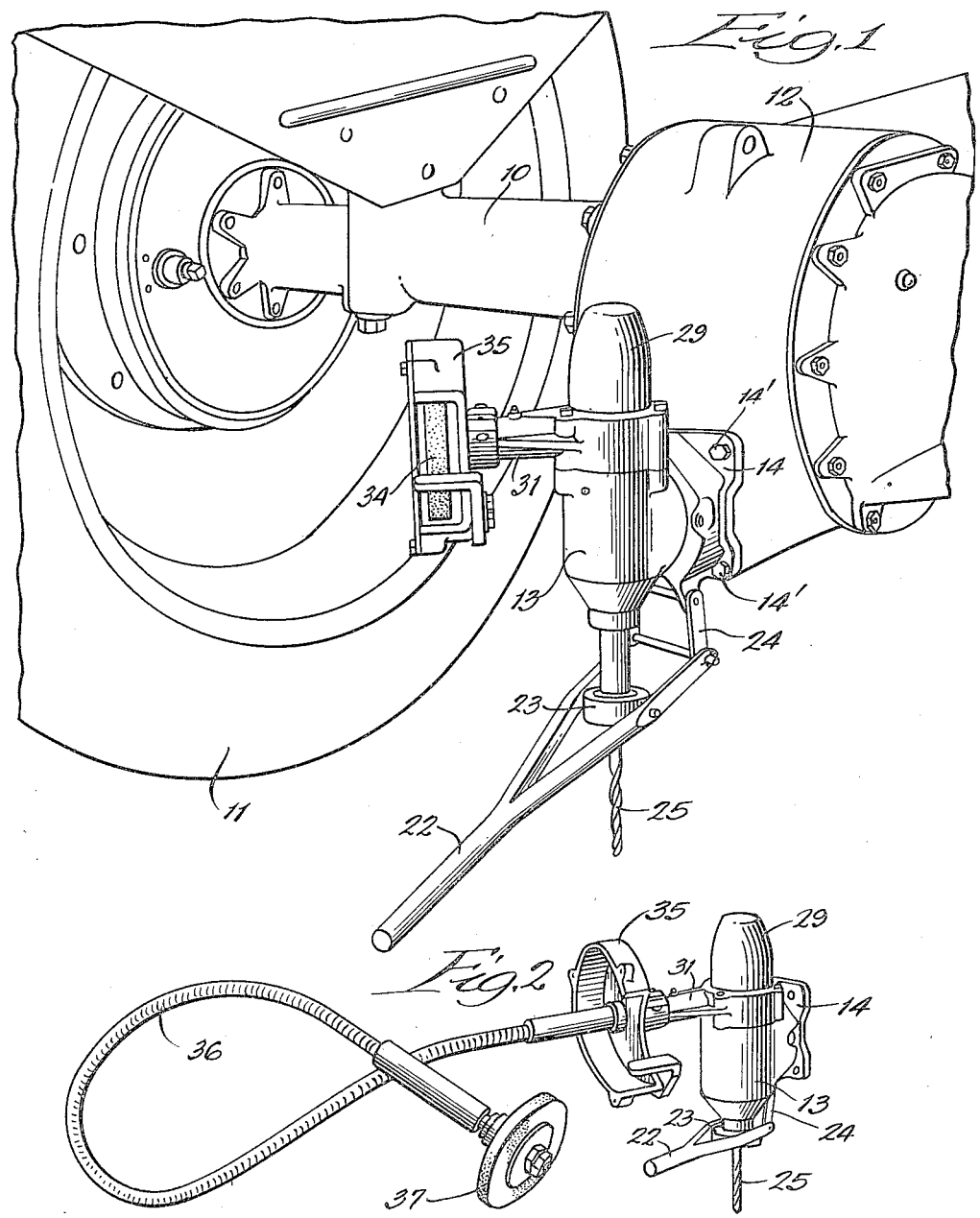

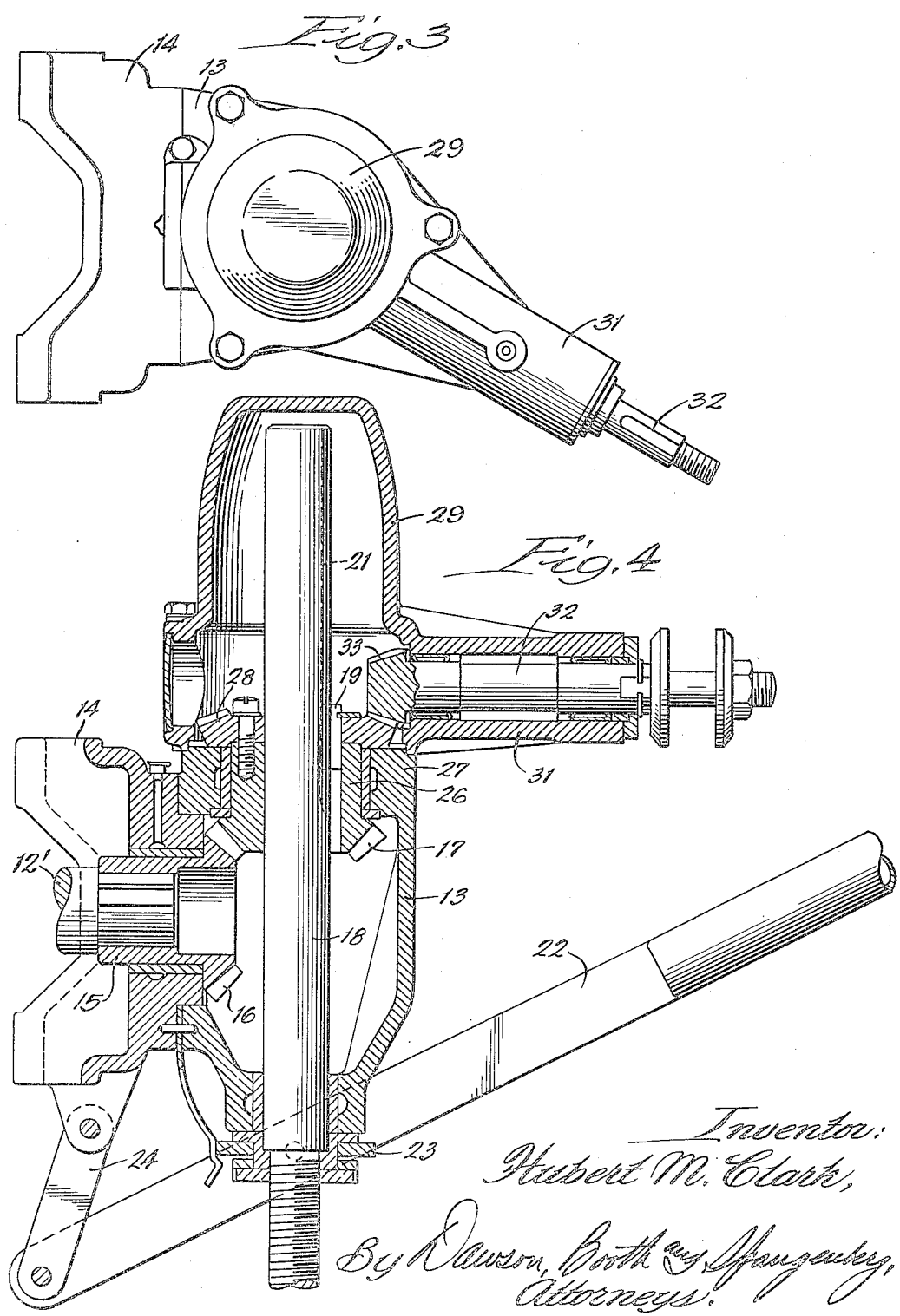

2,500,662

UNITED STATES PATENT OFFICE 2,500,662

DRILL PRESS CONSTRUCTION

Hubert M. Clark, Detroit, Mich., assignor to Sherman Products, Inc., Hazel Park, Mich., a corporation of Michigan Application July 30, 1947, Serial No. 764,861

7 Claims. (Cl. 74—11)

This invention relates to drill press construction and more particularly to a drill press attachment adapted to be connected to a tractor to be driven by the power take off shaft of the tractor.

In the operation of farms and similar establishments, it is frequently desirable to have various types of power operated tools such as drill presses, grinders, flexible shaft tools and the like. Heretofore it has been necessary to perform various machine operations either by hand or to provide separate power machines for performing the operations. Such establishments normally have tractors available, and it is one of the objects of the present invention to provide an attachment which can easily be attached to and detached from the tractor to be driven through the tractor power take off shaft for performing various types of power operations.

Another object is to provide a drill press attachment for connection to a tractor which can perform the usual drill press operations through utilization of the power of the tractor engine.

Still another object is to provide a drill press attachment in which provisions are made for driving various other types of power tools such as grinders, flexible shaft devices and the like. The attachment preferably includes an auxiliary shaft lying at an acute angle to the tractor power take off shaft for minimum interference with accessibility of the auxiliary shaft.

A further object is to provide a drill press construction in which the drill shaft drives an auxiliary shaft which can be utilized to operate various types of power tools.

The above and other objects and advantages of the invention will be more readily apparent when read in connection with the accompanying drawing, in which—

Figure 1 is a partial perspective view of a conventional farm tractor with a drill press attachment embodying the invention attached thereto;

Figure 2 is a perspective view of the drill press attachment illustrating the connection of a flexible shaft tool thereto;

Figure 3 is a top plan view of the attachment; and

Figure 4 is a vertical section.

The attachment of the present invention is adapted to be attached to and detached from a conventional type of farm tractor to receive its power through the usual power take off shaft of the tractor. As partially illustrated in Figure 1, the tractor includes a rear axle 10 supported on wheels 11 which are drivably connected through a differential mechanism enclosed in a casing 12. The tractor includes a power take off shaft 12' (Figure 4) which extends through an opening in the lower part of the differential casing 12.

The attachment, as shown, comprises a vertically elongated housing 13 which may be of cast metal or the like and which is formed at one side with an attachment plate 14 shaped to fit against the differential casing 12 over the opening therein. The plate 14 may be provided with openings to receive screws 14' to be threaded into the holes normally provided in the differential casing so that the housing is rigidly attached to the casing. The housing carries an annular driving sleeve 15 which is located centrally in the attaching plate in a position to receive the end of the power take off shaft 12', as shown in Figure 4. The take off shaft is normally splined at its end and the driving sleeve 15 is provided with internal splines through which it is drivably connected to the take off shaft when the housing is mounted on the differential casing.

The driving sleeve carries a bevel pinion 16 internally of the housing, the pinion, as shown, being formed integrally with the driving sleeve. The pinion 16 meshes with an annular bevel gear 17 which is mounted in the housing for rotation about a vertical axis and is held against vertical displacement in the housing. A drill shaft 18 is slidable longitudinally through the bevel gear 17 and is connected for rotation therewith as by means of a key 19 slidably fitting in a keyway 21 in the shaft. The shaft 18 may be moved vertically by means of a handle 22 which is connected through a ring 23 to the shaft so that the shaft can rotate freely but will move axially with the ring. The inner end of the lever 22 is split, as shown in Figure 1, and has its inner ends connected to links 24 which are pivoted to the housing. By rocking the lever, the shaft can be moved longitudinally without interrupting its driving connection with the gear 17. The shaft may carry a suitable chuck or other attaching means at its lower end for attachment to a drill 25 or to a similar tool.

As shown in Fig. 4, the bevel gear 17 is formed with an elongated tubular hub 26 which is journaled in an annular inwardly extending flange 27 in the housing. The gear is held in place by a face gear 28 screwed to the hub 26 and engaging the upper surface of the flange 27. In this way, the bevel gear 17 and the face gear are connected together and are held against axial movement in the housing. The shaft 18 extends upward through the face gear into a cover 29 which is detachably secured to the top of the casing 13.

At one side, the cover 29 is formed with a horizontal tubular projection 31 in which an auxiliary shaft 32 is journaled. The shaft 32 carries a pinion 33 meshing with the face gear 28. Thus, when the power takeoff shaft is turning, it will turn both the drill shaft 18 and the auxiliary shaft 32 through the pinion 17, the face gear 28, and the pinion 33.

As seen in Figs. 1 and 2, the auxiliary shaft may be utilized to drive a grinding wheel shown at 24. The wheel may be directly connected to the outer end of the auxiliary shaft and may be partially enclosed in a protective housing 35 which is mounted on the end of the tubular sleeve 31. According to one feature of the invention, as best seen in Figures 1 and 3, the sleeve 31 and the auxiliary shaft extend horizontally at an acute angle to the axis of the power takeoff shaft and the driving sleeve 15. This construction positions the wheel 34 in front of and at an angle to the length of the tractor so that minimum interference with access to the wheel is produced. With the wheel held in the position shown in Fig. 1, relatively large pieces can be moved against the wheel without interference from the adjacent tractor parts.

In using the attachment of the present invention, it can be easily attached to a conventional tractor merely by securing the fastening plate 14 to the tractor differential housing by means of the screws 14' with the tractor power takeoff shaft drivably engaging the driving sleeve 15. With a drill as shown at 25 attached to the drill shaft 18, the shaft can be moved up and down through the lever 22 to perform any desired type of drilling operations or of other operations normally performed with a drill press. For ordinary grinding operations, the grinding wheel 34 can be attached to the auxiliary shaft 32 in such a position that the work can conveniently be brought to the wheel for grinding.

For driving various other types of auxiliary devices such, for example, as flexible shaft driven units, a flexible shaft as shown at 36 may be attached to the auxiliary shaft. The core of the flexible shaft may be secured to the auxiliary shaft 32 by removing the outer cover plate of the housing 35, as shown in Fig. 2, and a tool such as a grinding wheel 37 may be attached to the outer end of the flexible shaft. It will be seen that the flexible shaft can easily clear the adjacent tractor parts without requiring any sharp bends therein due to the angle of the auxiliary shaft so that a tool on the end of the flexible shaft can be driven efficiently and easily. Furthermore, the change over from a directly connected grinding wheel, as shown in Fig. 1, to a flexible shaft tool, as shown in Fig. 2, can be made easily and quickly. It will be understood that any desired type of tool in place of the grinding wheel 37 might be employed.

While one embodiment of the invention has been shown and described in detail herein, it will be understood that this is illustrative only and is not to be taken as a definition of the scope of the invention, reference being had for this purpose to the appended claims.

What is claimed is:

1. A drill press attachment for use with a tractor having a power take off shaft comprising a housing formed at one side with a mounting flange for securing the housing to a tractor adjacent the power take off shaft, a driving member rotatably mounted in the housing adjacent the mounting flange and adapted to be connected to the power take off shaft, a ring member mounted in the housing for rotation about a vertical axis, means drivably connecting the ring member to the driving member, a vertical shaft slidably keyed in the ring member for vertical sliding movement, and means to slide the shaft vertically through the ring member.

2. A drill press attachment for use with a tractor having a power take off shaft comprising a housing formed at one side with a mounting flange for securing the housing to a tractor adjacent the power take off shaft, a driving member rotatably mounted in the housing adjacent the mounting flange and adapted to be connected to the power take off shaft, a ring member mounted in the housing for rotation about a vertical axis, means drivably connecting the ring member to the driving member, a vertical shaft slidably keyed in the ring member for vertical sliding movement, an auxiliary shaft rotatably mounted in the housing and drivably connected to the vertical shaft and lying at substantially a right angle to the axis of the vertical shaft, and means to slide the vertical shaft vertically.

3. A drill press attachment for use with a tractor having a power take off shaft comprising a housing formed at one side with a mounting flange for securing the housing to a tractor adjacent the power take off shaft, a driving member rotatably mounted in the housing adjacent the mounting flange and adapted to be connected to the power take off shaft, a ring member mounted in the housing for rotation about a vertical axis, means drivably connecting the ring member to the driving member, a vertical shaft slidably keyed in the ring member for vertical sliding movement, an auxiliary shaft rotatably mounted in the housing and drivably connected to the vertical shaft and lying at substantially a right angle to the axis of the vertical shaft, and at an acute angle to the axis of the driving member, and means to slide the vertical shaft vertically.

4. A drill press attachment for use with a tractor having a gear casing and a horizontal power take off shaft extending through an opening therein, said attachment comprising a housing formed at one side with a mounting plate for attachment to the tractor gear casing over the opening therein, a driving member located centrally of the mounting plate for rotation about a horizontal axis and formed for connection to the take off shaft, an annular bevel gear mounted in the housing for rotation about a vertical axis, a bevel pinion on the driving member meshing with the bevel gear, a vertical shaft extending slidably through the bevel gear and keyed thereto, and means to slide the shaft vertically through the bevel gear.

5. A drill press attachment for use with a tractor having a gear casing and a horizontal power takeoff shaft extending through an opening therein, said attachment comprising a housing formed at one side with a mounting plate for attachment to the tractor gear casing over the opening therein, a driving member located centrally of the mounting plate for rotation about a horizontal axis and formed for connection to the takeoff shaft, an annular bevel gear mounted in the housing for rotation about a vertical axis, a bevel pinion on the driving member meshing with the bevel gear, a vertical shaft extending slidably through the bevel gear and keyed thereto, means to slide the shaft vertically, a face gear connected to the bevel gear, an auxiliary shaft carried by the housing for rotation about a horizontal axis, and a pinion on the auxiliary shaft meshing with the face gear.

6. A drill press attachment for use with a tractor having a gear casing and a horizontal power takeoff shaft extending through an opening therein, said attachment comprising a housing formed at one side with a mounting plate for attachment to the tractor gear casing over the opening therein, a driving member located centrally of the mounting plate for rotation about a horizontal axis and formed for connection to the takeoff shaft, an annular bevel gear mounted in the housing for rotation about a vertical axis, a bevel pinion on the driving member meshing with the bevel gear, a vertical shaft extending slidably through the bevel gear and keyed thereto, means to slide the shaft vertically, a face gear connected to the bevel gear, an auxiliary shaft carried by the housing for rotation about a horizontal axis, and a pinion on the auxiliary shaft meshing with the face gear, the auxiliary shaft lying with its axis at an acute angle to the axis of the driving member.

7. In a drill press construction, a housing, an annular internal flange in the housing, an annular ring member having a tubular hub extending through the flange for rotation about a vertical axis and having an annular enlarged shoulder at one end to limit its movement through the flange in one direction, a shaft slidable through the ring member and keyed thereto to be driven thereby, means to slide the shaft vertically through the ring member, a face gear connected to the other end of the ring member and engaging the flange to limit movement of the ring member therethrough in the other direction, an auxiliary shaft rotatably mounted in the housing substantially at a right angle to the first named shaft, and a pinion on the auxiliary shaft drivably connecting the auxiliary shaft to the face gear.

HUBERT M. CLARK.

REFERENCES CITED

The following references are of record in the file of this patent:

UNITED STATES PATENTS

| Number | Name | Date |
|---|---|---|
| 501,415 | Garey | July 11, 1893 |
| 521,677 | Smith | June 19, 1894 |
| 745,721 | Fetzer | Dec. 1, 1903 |
| 897,316 | Stewart | Sept. 1, 1908 |
| 1,205,982 | Eason et al. | Nov. 28, 1916 |
| 1,884,657 | Gerlinger | Oct. 25, 1932 |
| 2,109,519 | Altorfer | Mar. 1, 1938 |
| 2,227,410 | Johnson | Dec. 31, 1940 |